United States Patent [19]

Wiwi

[11] Patent Number: 5,069,164
[45] Date of Patent: Dec. 3, 1991

[54] ANIMAL FEEDER

[75] Inventor: Mark A. Wiwi, South Bend, Ind.

[73] Assignee: Universal Cooperatives, Inc., Minneapolis, Minn.

[21] Appl. No.: 475,956

[22] Filed: Feb. 6, 1990

[51] Int. Cl.⁵ .............................................. A01K 5/00
[52] U.S. Cl. ........................................ 119/53; 119/54
[58] Field of Search ...................... 119/52.1, 53, 53.3, 119/54

[56] References Cited

U.S. PATENT DOCUMENTS

| | | | |
|---|---|---|---|
| 2,513,200 | 6/1950 | Pax | 119/53.5 |
| 4,582,023 | 4/1986 | Zumbahlen | 119/53.5 |
| 4,719,875 | 1/1988 | Van Gilst | 119/53.5 |
| 4,729,344 | 3/1988 | Winkel | 119/53.5 |
| 4,841,912 | 6/1989 | Oswald | 119/53 |
| 4,889,078 | 12/1989 | Smiley | 119/53.5 |

FOREIGN PATENT DOCUMENTS 713353 10/1931 France ............................ 119/53.5

Primary Examiner—John G. Weiss
Attorney, Agent, or Firm—James D. Hall

[57] ABSTRACT

An animal feeder having a rotatable feed plate. A spacer is carried by the feed plate to limit the amount of feed carried by the plate and further prevents accumulation of feed on the central portion feed plate. Limiting the amount of feed on the plate reduces the weight of feed to allow rotation of the plate by a smaller feeding animal. The spacer of this invention further reduces feed spoilage caused by static feed typically collected on the feed plate central portion. The feed plate is spaced from the feed trough by a central raised portion of the base to isolate feed carried on the plate from that in the trough. Isolating feed on the feed plate in this manner prevents the wicking of moisture from the trough into the hopper.

5 Claims, 3 Drawing Sheets

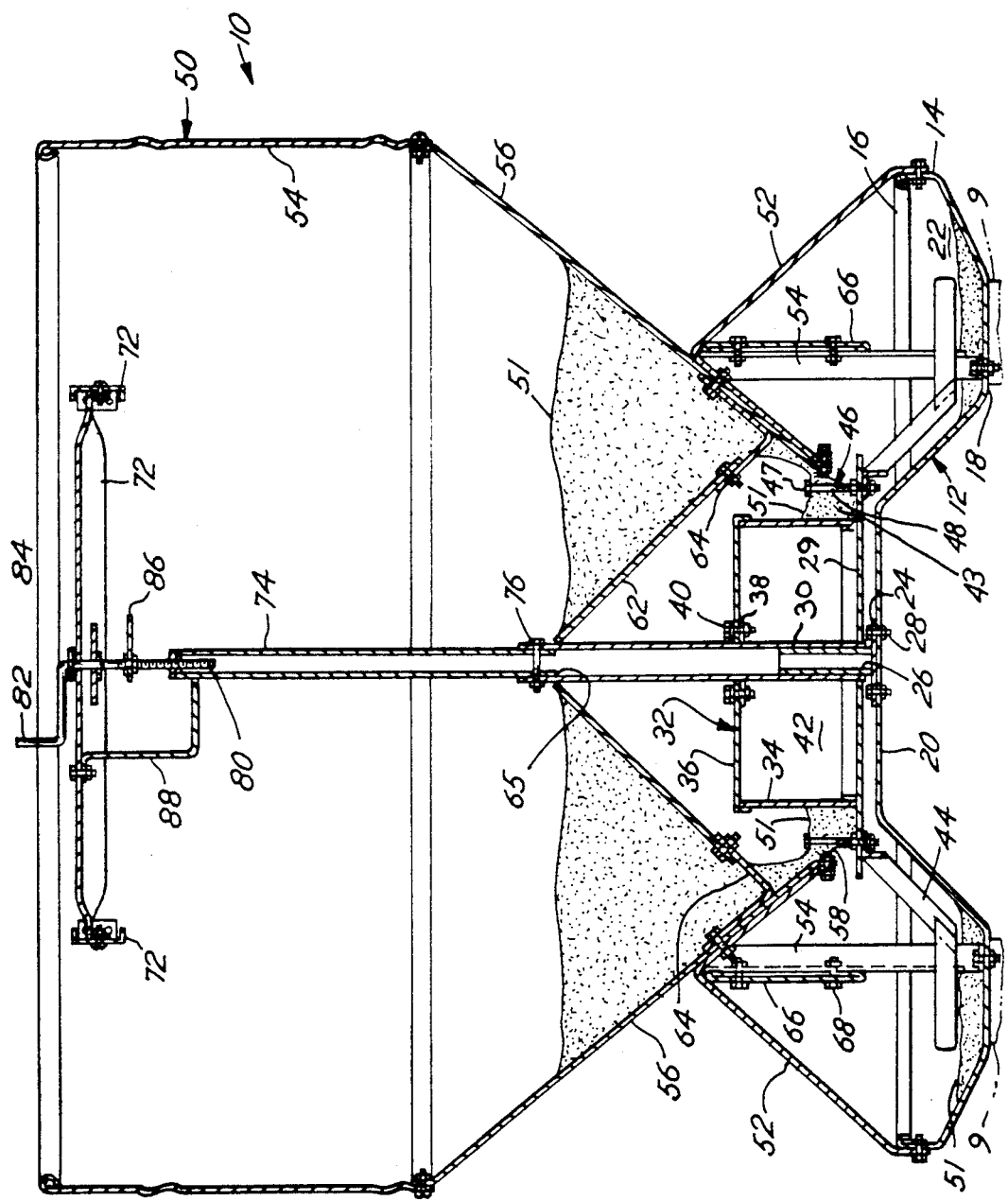

ANIMAL FEEDER

FIELD OF THE INVENTION

This application relates to animal feeders and will have specific relevance to a gravity flow hog feeder which limits the quantity of feed on the feed plate.

BACKGROUND OF THE INVENTION

Heretofore, hog feeders which included a rotatable feed plate typically have a cone shaped baffle to support most of the weight of the feed and to permit the feed plate to rotate under force of the rooting hog. Such a hog feeder construction is illustrated in U.S. Pat. Nos. 4,729,344 and 4,462,338. One problem, however, with current hog feeders which use a rotatable feed plate is that feed near the center of the feed plate is generally stationary. The feed passed to the animal generally falls from the periphery of the feed plate. Therefore, feed near the center of the plate is generally stationary for long periods of time. The stationary feed near the center of the feed plate is highly susceptible to spoilage. Spoiled feed in a feeder leads toward the contamination of the remainder of the feed and possibly even to infection of the feeding animal. Further, if the feeder is to be used for smaller pigs, often the weight of feed on the plate prevents the pigs from moving the plate. This problem can be overcome by limiting the amount of feed in the hopper. However, this solution requires the livestock manager to fill the hopper more often which is undesirable, especially for remote feeder locations.

SUMMARY OF THE INVENTION

The hog feeder of this invention eliminates the above problems by providing a feeder with a rotatable feed plate which includes a spacer supported on the plate. The spacer includes a side wall extending upwardly from the feed plate and a top wall. The spacer along with the supporting portion of the feed plate defines a feed free enclosure which prevents feed from being carried on the central portion of the plate. The feed is carried on the feed plate about the spacer. Therefore, the problem of feed spoilage and excessive weight from feed carried on the inner or center portion of the feed plate is overcome.

Accordingly, it is an object of this invention to provide a novel hog feeder.

Another object of this invention is to provide for a hog feeder wherein the amount of feed on the feed plate is controlled.

Another object of this invention is to provide a hog feeder which includes a spacer carried by the feed plate for preventing feed from being carried on the central portion of the feed plate.

Still other objects of this invention will be apparent upon a reading of the following description taken with the accompanying drawings.

BRIEF DESCRIPTION OF THE DRAWINGS

FIG. 3 is a sectional view similar to FIG. 2 showing the feeder in a partially open position and having feed carried within the hopper and on the feed plate for distribution to the feed trough.

DESCRIPTION OF THE PREFERRED EMBODIMENT

Figure 1:
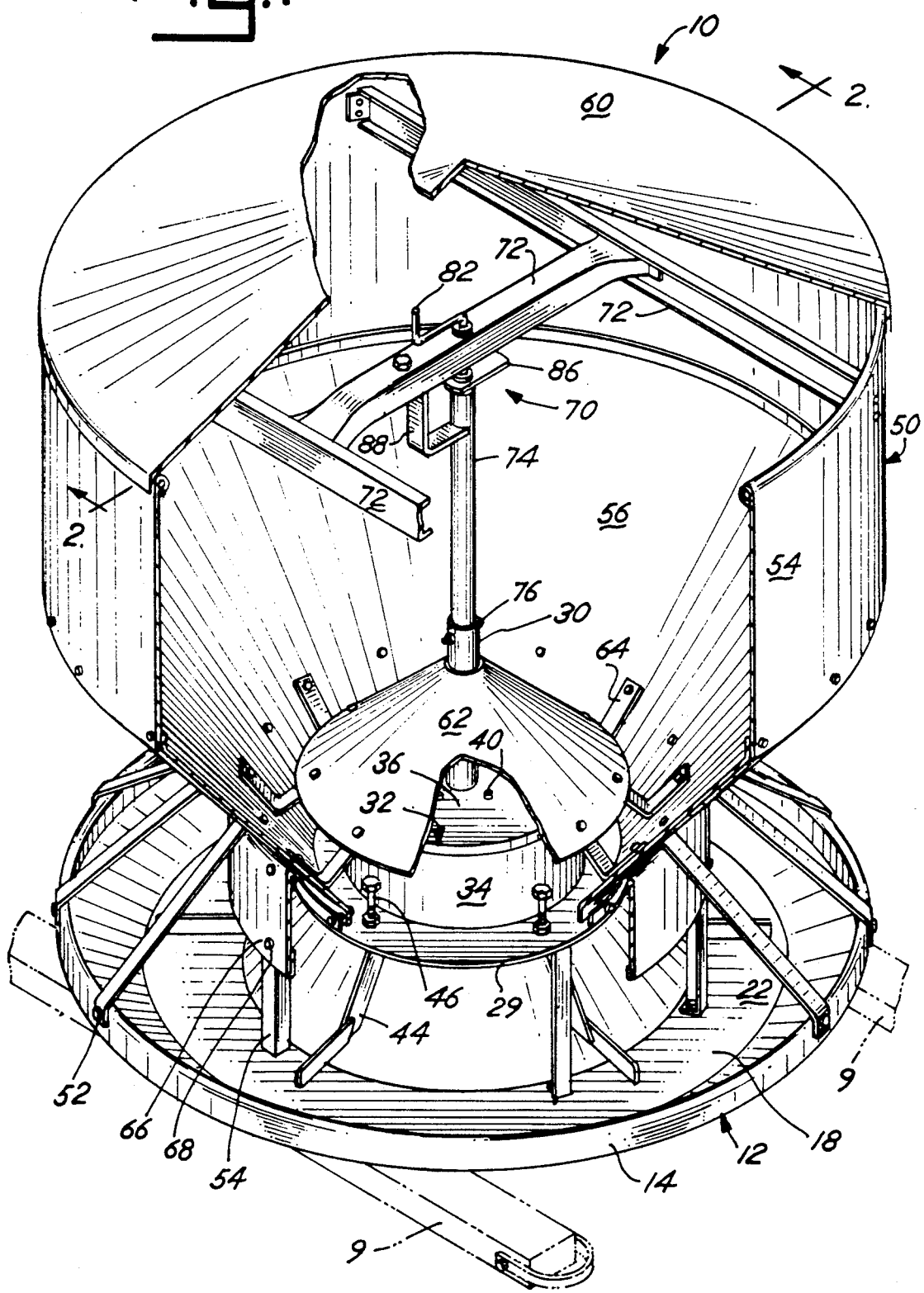
FIG. 1 is a perspective view of the hog feeder of this invention with portions cut away for illustrative purposes.
Figure 2:
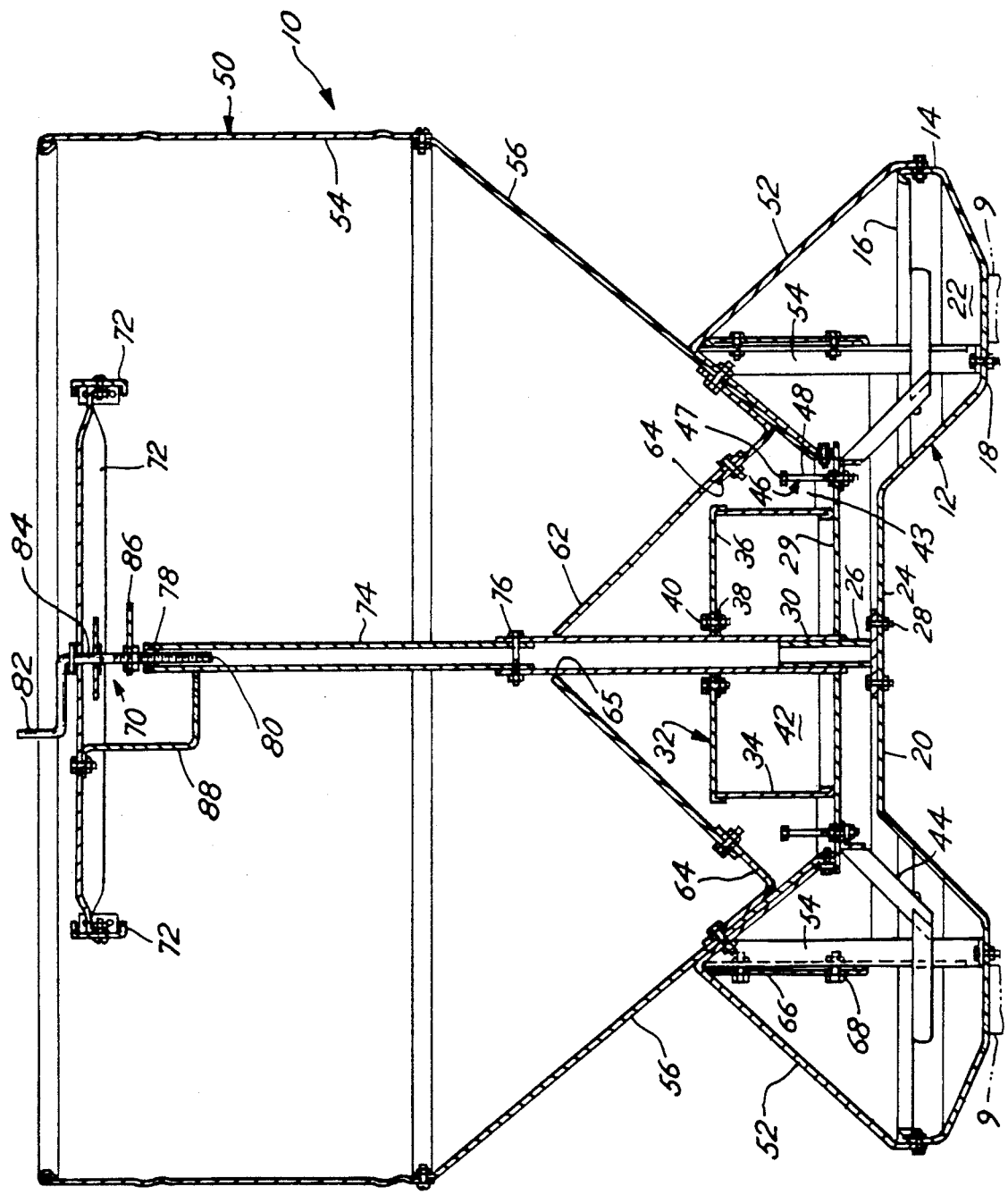
FIG. 2 is a sectional view taken along line 2—2 of FIG. 1.

The preferred embodiment herein described is not intended to be exhaustive or to limit the application to the precise form disclosed. Rather it is chosen and described in order to explain the invention, its application and practical use to enable others skilled in the art to utilize the invention.

The hog feeder 10 depicted in the figures includes a generally circular base 12 defined by side wall 14 and a bottom wall 18. Side wall 14 includes an upper circumferential rim 16. Bottom wall 18 of base 12 includes a centrally located raised portion 20 which with base side wall 14 defines a feed receiving trough 22. Typically, feeder 10 is connected to wooden skids 9 (shown in broken lines only) for towing.

A plate 24 which carries a post 26 is connected by fasteners 28 to raised portion 20 and defines the central longitudinal axis of feeder 10. A post 30 is slidably fitted over post 26 so as to be rotatable thereabout. Feed distributor plate 29 is connected to post 30 in a common manner as by welding. Post 30 extends through a central opening in the plate as shown. A generally cylindrical spacer 32 is attached to feed plate 29 and includes a side wall 34 and top wall 36. Top wall 36 has a central opening through which post 30 extends as shown. A plate 38 is connected to post 30 as by welding and is connected to top wall 36 by fasteners 40. Spacer 32 and feed plate 29 define a central feed free area 42 and peripheral feed receiving area 43 on the feed plate. A plurality of arms 44 extend angularly outwardly and downwardly from plate 29 into feed trough 22 as illustrated and are connected to the feed plate by fasteners 46. Fasteners 46 are positioned exterior of spacer 32 and include a head 47 and shaft 48 which extends upwardly from plate 29 into feed receiving area 43.

A hopper 50 is supported above trough 22 by supports 52, 54. Hopper 50 houses a quantity of animal feed 51 (see FIG. 3) and includes a generally cylindrical side wall 54 and a tapered bottom 56 which defines a feed discharge opening 58 (see FIG. 3) above plate 29. A fixed deflector 62 is supported within hopper 50 above opening 58 by brackets 64. Deflector 62 has a central opening 65 through which post 30 extends. A top 60 (shown only in FIG. 1) is removably carried by hopper 50 as is common in the industry.

A peripheral restraining wall 66 connected to supports 54 by fasteners 68 extends downwardly from hopper bottom wall 56 and terminates a predetermined distance above trough 22. Restraining wall 66 is included to prevent animals from stepping into trough 22 and eating directly off of feed plate 29.

A feed plate adjustment assembly 70 is supported within hopper 50 by hangers 72 as illustrated and is connected to tube 30 by a tube 74 and a fastener 76. A nut 78 or similar threaded orifice is fastened within the upper end of tube 74 for accommodating the threaded portion 80 of adjustment crank 82. The shaft 84 of crank 82 is rotatively accommodated by a hanger 72 in a common manner. An adjustable stop 86 is carried by shaft 84 on threaded portion 80. A pointer 88 is connected to and extends downwardly from a hanger 72 and is shaped as shown to be in close proximity to tube 74. Tube 74 would typically include measurement indicia (not shown) adjacent pointer 88 to provide a spacing guide for the user.

In use, after placing a quantity of feed 51 (preferably about 2000 lbs) within hopper 50, a user rotates crank 82, which through the interconnection of tubes 74 and 30 lowers feed plate 29 relative to feed discharge opening to permit a quantity of feed to fall from plate 29 into trough 22. Pointer 88 in association with measurement indicia (not shown) on tube 74 indicates to the user the space between plate 29 and hopper bottom opening 58. As a feeding animal pushes against an arm 44, plate 29 is rotated slightly about post 26 which causes additional feed to flow from hopper 50 onto feed receiving area 43 of plate 29. The additional feed flowing into area 43 causes a portion of the feed already on plate 29 to fall from the plate into trough 22 under force of gravity. The distance between discharge opening 58 and feed plate 29 determines the rate of feed flow from the plate into trough 22. Preferably the flow rate is set to prevent the accumulation of excess feed in trough 22. It is illustrated and should be noted that plate 29 is spaced above trough 22 by raised portion 20 of bottom wall 18. The spacing between plate 29 and the hopper bottom is purposely provided to prevent the wicking of moisture from the trough into the hopper. It should also be noted that as plate 29 is vertically adjusted relative to hopper bottom opening 58 by adjustment assembly 70, arms 44 follow plate 29 and are likewise adjusted relative to trough 22. Fasteners 46 extend upwardly from plate 29 into feed receiving area 43 to provide agitation of feed and assist in breaking up clumps of feed during rotation of plate 29.

The weight of animal feed 51 held in hopper 50 is substantially supported by fixed deflector 62 as is common to allow movement of the feed plate 29 by a rooting animal. Spacer 32 which, as described earlier, defines a feed free inner area 42 is included to further limit the amount of feed 51 and correspondingly the feed weight on plate 29 at any one time by preventing feed from flowing into area 42. Reduced feed weight on plate 29 permits rotation of the plate by even smaller animals while permitting the livestock manager to fill hopper 50 to its capacity. Further, spacer 32 prevents accumulation of feed 51 in area 42 which would typically be static on a prior art feed plate as described earlier. Static feed over time is susceptible to spoilage which could infect the remainder of the feed in the hopper. The feed free area 42 defined in part by spacer 32 prevents such static feed buildup.

It should be understood that while the invention is described in use with a hog feeder its application may be universally adapted to any feeder having a rotative feed plate. It should be also understood that the invention is not limited to the precise form disclosed but may be modified within the scope of the appended claims.

I claim:

1. An animal feeder including a hopper for storing feed and defining a feed discharge opening, said hopper further including a base defining a feed receiving trough positioned beneath the hopper, a feed plate rotatably supported above said base and below said discharge opening, said feed plate supporting a portion of animal feed stored within said hopper wherein feed flows from said hopper through said discharge opening onto said feed plate and from said plate into said trough, and a deflector means positioned above said plate for substantially supporting the weight of feed within the hopper, the improvement comprising a spacer means carried adjacent said feed plate beneath said deflector means, said spacer means for limiting the quantity of feed carried by said plate.

2. The animal feeder of claim 1 wherein said spacer means being carried by said plate and includes a side wall extending upwardly from said plate toward said hopper and a top wall, said spacer side wall and top wall defining a feed free enclosure on said plate.

3. The animal feeder of claim 2 further including means carried by said plate external of said enclosure for agitating feed exiting said food discharge opening.

4. The animal feeder of claim 3 wherein said feed plate includes a plurality of arms extending into said trough, each of said arms being connected by a fastener, said fastener extending upwardly from said plate and constituting said agitating means, wherein an animal pushing against one of said arms causes said feed plate to rotate.

5. The animal feeder of claim 1 further including means connected to said hopper and operatively associated with said plate for adjusting the distance between said hopper adjacent said opening and said plate.

* * * * *